US008648639B2

(12) United States Patent
Lee et al.

(10) Patent No.: US 8,648,639 B2
(45) Date of Patent: Feb. 11, 2014

(54) DUTY ADJUSTMENT CIRCUITS AND SIGNAL GENERATION DEVICES USING THE SAME

(71) Applicant: Via Technologies, Inc., New Taipei (TW)

(72) Inventors: Yeong-Sheng Lee, Fremont, CA (US); Kuen-Chir Wang, Fremont, CA (US)

(73) Assignee: Via Technologies, Inc., New Taipei (TW)

( * ) Notice: Subject to any disclaimer, the term of this patent is extended or adjusted under 35 U.S.C. 154(b) by 0 days.

(21) Appl. No.: 13/644,403

(22) Filed: Oct. 4, 2012

(65) Prior Publication Data

US 2013/0099840 A1    Apr. 25, 2013

Related U.S. Application Data

(60) Provisional application No. 61/549,359, filed on Oct. 20, 2011.

(51) Int. Cl.
*H03K 3/017* (2006.01)

(52) U.S. Cl.
USPC .......................................... 327/175; 327/172

(58) Field of Classification Search
None
See application file for complete search history.

(56) References Cited

U.S. PATENT DOCUMENTS 8,310,849 B2 *  11/2012  Lin et al. .................. 363/41

* cited by examiner

*Primary Examiner* — Cassandra Cox
(74) *Attorney, Agent, or Firm* — McClure, Qualey & Rodack, LLP (57) ABSTRACT

A duty adjustment circuit is provided. The duty adjustment circuit is used to adjust a duty cycle of a first driving signal. The duty adjustment circuit includes a filter, a first comparator, and a first duty adjustor. The filter receives a comparison result signal and filters the comparison result signal to generate a duty information signal. The duty information signal indicates a duty cycle of the comparison result signal. The first comparator receives the duty information signal and determines whether a direct-current (DC) level of the duty information signal falls into a predefined voltage range to generate a first adjustment signal. The first duty adjustor receives the first adjustment signal and the first driving signal and adjusts the duty cycle of the first driving signal according to the first adjustment signal.

20 Claims, 6 Drawing Sheets

DUTY ADJUSTMENT CIRCUITS AND SIGNAL GENERATION DEVICES USING THE SAME

CROSS REFERENCE TO RELATED APPLICATIONS

This application claims the benefit of U.S. Provisional Application No. 61/549,359, filed on Oct. 20, 2012, the contents of which are incorporated herein by reference.

BACKGROUND OF THE INVENTION

1. Field of the Invention

The invention relates to a duty adjustment circuit, and more particularly to a duty adjustment circuit applied in a signal generation device for balancing output currents of the signal generation device.

2. Description of the Related Art

In general, a single-phase DC-to-DC voltage converter provides a small current.

Thus, there is an insufficient power delivery capability to drive circuits positioned thereafter. Accordingly, a multi-phase technique is employed in DC-to-DC voltage converters so that power delivery capability can increase by 2-fold or multi-fold. The successful application of the multi-phase technique relies on the current balance between the multi phases. When the multi-phase currents do not balance, the elements on the current path of the phases with the larger currents may be damaged.

BRIEF SUMMARY OF THE INVENTION

An exemplary embodiment of a duty adjustment circuit is provided. The duty adjustment circuit is used to adjust a duty cycle of a first driving signal. The duty adjustment circuit comprises a filter, a first comparator, and a first duty adjustor. The filter receives a comparison result signal and filters the comparison result signal to generate a duty information signal. The duty information signal indicates a duty cycle of the comparison result signal. The first comparator receives the duty information signal and determines whether a direct-current (DC) level of the duty information signal falls into a predefined voltage range to generate a first adjustment signal. The first duty adjustor receives the first adjustment signal and the first driving signal and adjusts the duty cycle of the first driving signal according to the first adjustment signal.

An exemplary embodiment of a signal generation device is provided. The signal generation device is used to generate an output signal. The signal generation device comprises a first output circuit, a second output circuit, and a duty adjustment circuit. The first output circuit provides a first output current to a first node according to a first control signal. The second output circuit provides a second output current to a second node according to a second control signal. The duty adjustment circuit filters a comparison result signal to generate a duty information signal, generates the first control signal according to a first driving signal and the duty information signal, and generates the second control signal according to a second driving signal and the duty information signal. The duty information signal indicates a duty cycle of the comparison result signal. The first and second control signals are generated according to whether a DC level of the duty information signal falls into a predefined voltage range. The duty cycles of the first and second control signals are adjusted to balance the first and second output currents.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

In a voltage converter with N phases, the ripple frequency is Nf, where f is the switching frequency of each phase; therefore, both the ripple is reduced and the requirements of the input and output filters are relaxed. Each switch and inductor conducts N times less current than in an equivalent conventional voltage converter. However, there is a potential problem with current unbalance. The thermal constraints as well as the dimensioning of the semiconductors and inductors of each phase depend on the maximum current they deliver; small variations in the characteristics of each phase could generate a significant current unbalance, leading to the need to overdesign the components. Additionally, if the currents are not balanced properly, frequency components below Nf are present in the input current, and devices on the current path may be damaged. In conclusion, many of the advantages of the multi-phase topology are lost if the currents are not balanced.

In multi-phase voltage converters, an error amplifier is usually employed to increase the sensitivity of current sensing in DC-to-DC voltage converters. In addition, in order to adjust the output current of each phase, each phase needs a reference voltage generated by an oscillator which needs to be adjusted by an offset voltage when the output current of the corresponding phase needs adjustment. Such complicated designs increase the design efforts and layout area required in designing multi-phase voltage converters. It is therefore required to develop a duty adjustment circuit with a simple structure (i.e., without such bulky devices) for balancing output currents in a signal generation device such as a multi-phase voltage converter.

Figure 1:
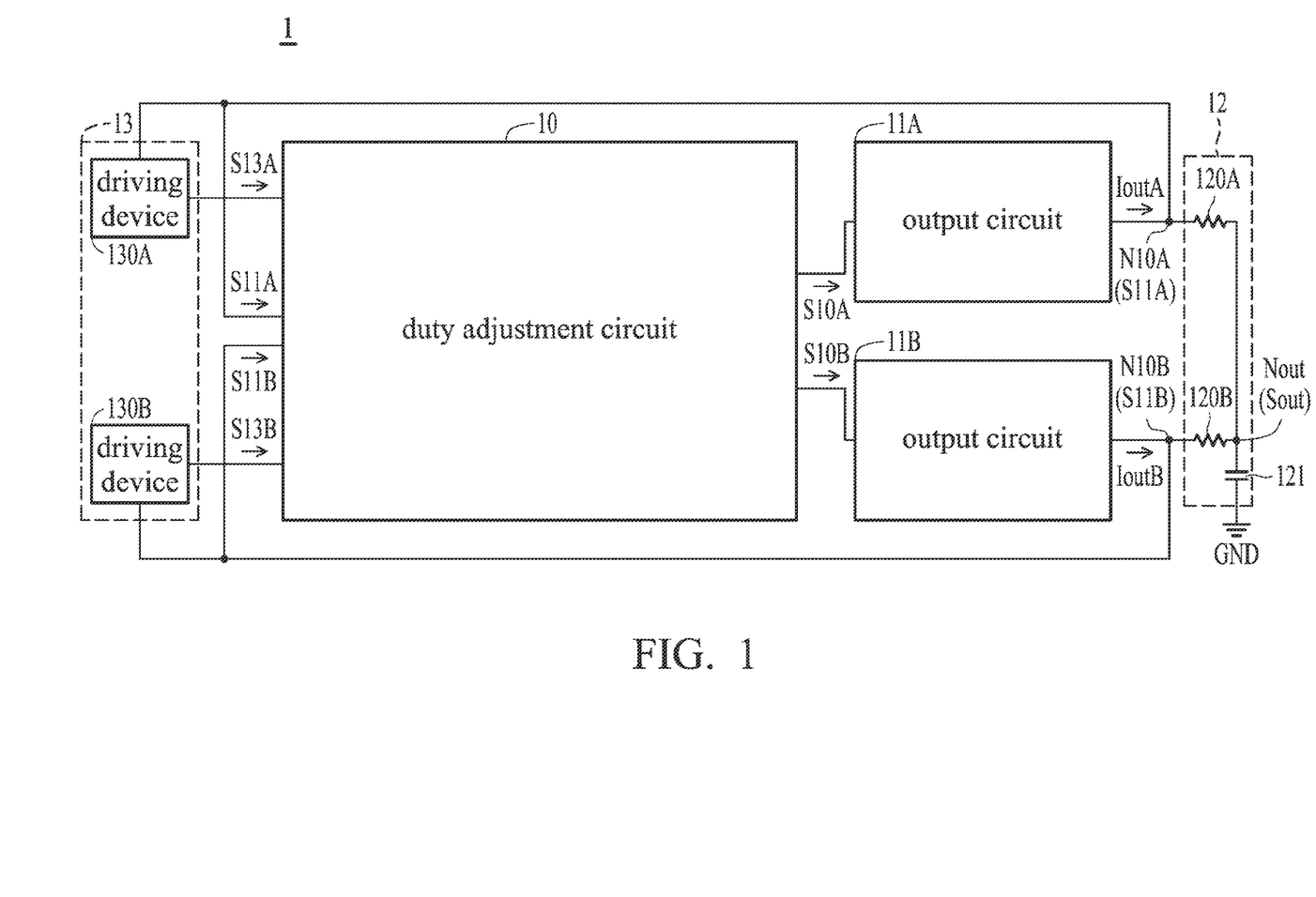
FIG. 1 shows one exemplary embodiment of a signal generation device.

In an exemplary embodiment of a signal generation device in FIG. 1, a signal generation device 1 comprises a duty adjustment circuit 10, output circuits 11A and 11B, a load circuit 12, and a driving circuit 13. The signal generation device 1 is used to generate an output signal Sout10. The driving circuit 13 comprises driving devices 130A and 130B, which respectively provide driving signals S13A and S13B to respectively control the output circuits 11A and 11B through the duty adjustment circuit 10 according the differences between a reference voltage and their respective output voltages at nodes N10A and N10B, as usual in conventional voltage converters. The duty adjustment circuit 10 generates control signals S10A and S10B according to its two input voltage signals and two driving signals S13A and S13B, respectively. The output circuit 11A receives the control signal S10A and generates an output current IoutA at the node N10A according to the control signal S10A. The output circuit 11B receives the control signal S10B and generates an output current IoutB at the node N10B according to the control signal S10B. In the embodiment, the amount of the output current IoutA is determined by the duty cycle of the control signal S10A, while the amount of the output current IoutB is determined by the duty cycle of the control signal S10B. The load circuit 12 is coupled to the nodes N10A and N10B. Referring to FIG. 1, the load circuit 12 comprises resistors 120A and 120B and a capacitor 121. The resistor 120A is coupled between the node N10A and an output node Nout, while the resistor 120B is coupled between the node N10B and the output node Nout. The capacitor 121 is coupled between the output node Nout and a reference ground GND. The load circuit 12 generates the output signal Sout at the output node Nout according to the output currents IoutA and IoutB. Moreover, due to the arrangement of the resistors 120A and 121B, feedback voltage signals S11A and 511B are generated at the nodes N10A and N10B according to the resistance values of the resistors 120A and 120B and the output currents IoutA and IoutB, respectively. The duty adjustment circuit 10 receives the feedback voltage signals 511A and 511B to serve as its input voltage signals. In the embodiment, the duty adjustment circuit 10 determines the duty cycles of the control signals S10A and S10B according to the feedback voltage signals S11A and 511B to control the amounts of the output currents IoutA and IoutB, respectively, thereby balancing the output currents IoutA and IoutB. The driving devices 130A and 130B may comprise circuit elements in common voltage converters to control the output circuits 11A and 11B according the difference between the output voltages at the nodes N10A and N10B and the reference voltage. In one embodiment, the driving device 130A (130B) may comprise a comparator with input terminals receiving the reference voltage and the output voltage at the node N10A (N10B) and an output terminal outputting the driving signal S13A (513B). Accordingly, when the output voltage at the node N10A (N10B) varies, the driving signal S13A (S13B) also varies.

Figure 2:
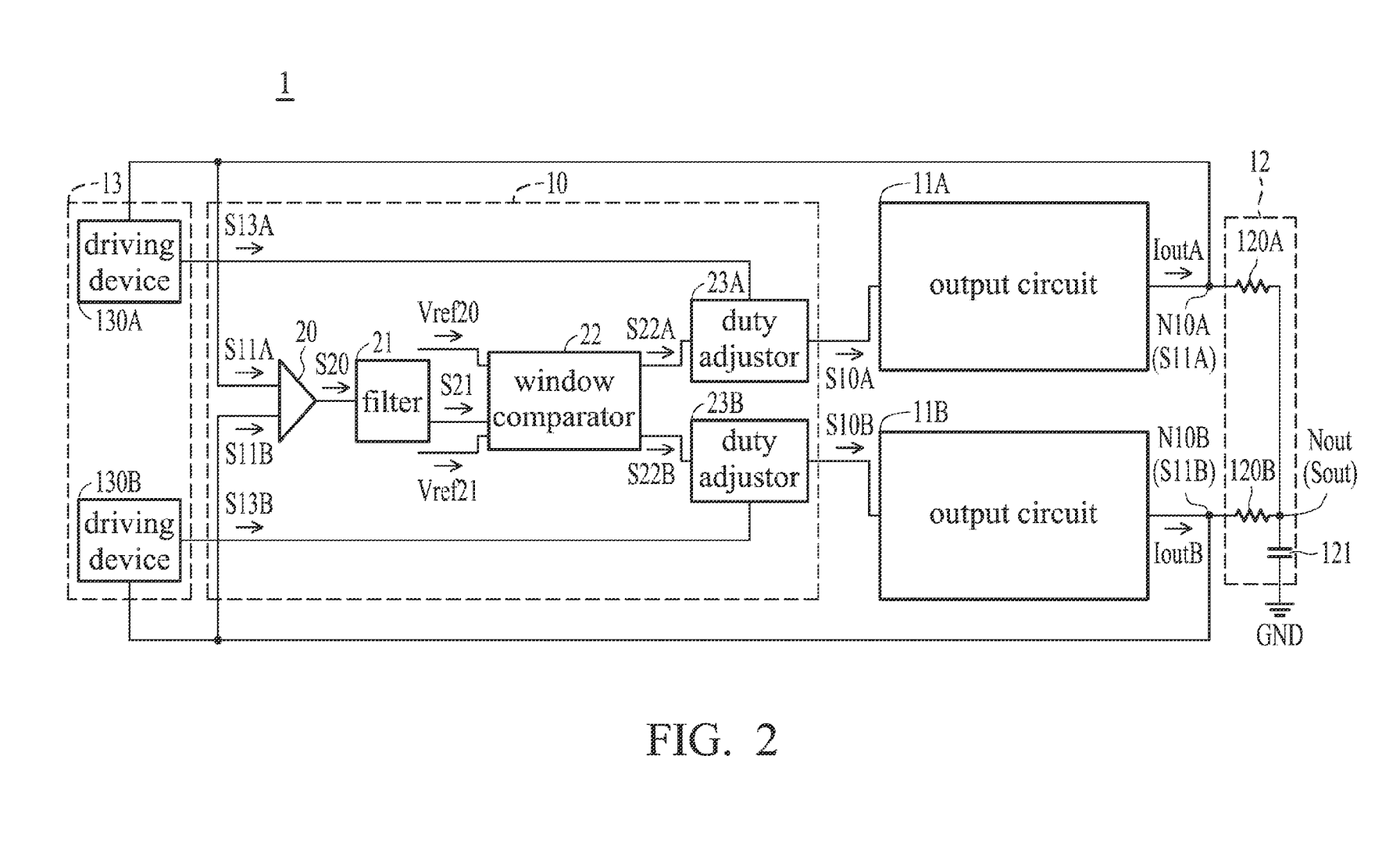
FIG. 2 shows an exemplary embodiment of a duty adjustment circuit in the signal generation device of FIG. 1.

FIG. 2 shows an exemplary embodiment of the duty adjustment circuit 10. Referring FIG. 2, the duty adjustment circuit 10 comprises a comparator 20, a filter 21, a window comparator 22, and duty adjustors 23A and 23B. The comparator 20 receives the feedback voltage signals S11A and S11B derived from the output currents IoutA and IoutB, respectively, and generates a comparison result signal S20. Accordingly, the duty cycle of the comparison result signal S20 is determined according to the balance state of the output currents IoutA and IoutB. The filter 21 receives the comparison result signal S20 and filters the comparison result signal S20 to generate a duty information signal S21. Through the filtering operation of the filter 21, the direct-current (DC) level of the duty information signal S21 indicates the duty cycle of the comparison result signal S20. In other words, the DC level of the duty information signal S21 varies with the duty cycle of the comparison result signal S20. Thus, the DC level of the duty information signal S21 provides information as to the balance state of the output currents IoutA and IoutB. The window comparator 22 receives two reference voltages Vref20 and Vref21 to predefine a voltage range, wherein one reference voltage Vref20 serves as the upper limit voltage defined for the voltage range, while the other reference Vref21 serves as the lower limit voltage defined for the voltage range (Vref20~Vref21). The window comparator 22 further receives the duty information signal S21 and determines whether the DC level of the duty information signal S21 falls into the redefined voltage range to generate two adjustment signals S22A and S22B. The duty adjustors 23A and 23B generate the control signals S10A and S10B, respectively. The duty adjustor 23A receives the adjustment signal S22A and the driving signal S13A and determines the duty cycle of the control signal S10A according to the adjustment signal S22A and the driving signal S13A, while the duty adjustor 23B receives the adjustment signal S22B and the driving signal S13B and determines the duty cycle of the control signal S10B according to the adjustment signal S22B and the driving signal S13B. According to the duty-cycle determinations of the control signals S10A and S10B, the duty-cycles of the control signals S10A and S10B may be adjusted, such that the output currents IoutA and IoutB may be balanced. Moreover, when the duty-cycle of the control signal S10A (S10B) is adjusted, the output voltage at the node N10A (N10B) varies, such that the driving signal S13A (S13B) varies.

The detailed duty-cycle determinations and adjustment operations will be described in the following by referring to FIGS. 1-2 and 3A-3C.

The window comparator 22 with the predefined voltage range serves to provide an unbalance tolerance range in which the duty-cycle adjustment would not be needed. When the difference between the output currents IoutA and IoutB of the different phases is within an acceptable range (that is the unbalance tolerance range), the duty adjustment circuit 10 takes no action to adjust the output currents IoutA and IoutB, and the output currents IoutA and IoutB of the different phase can remain stable. In another embodiment, the window comparator 22 may be substituted with an ordinary comparator with one reference voltage which provides no unbalance tolerance range. In one embodiment, the filter 21 may be a switched-capacitor RC filter.

Figure 3A:
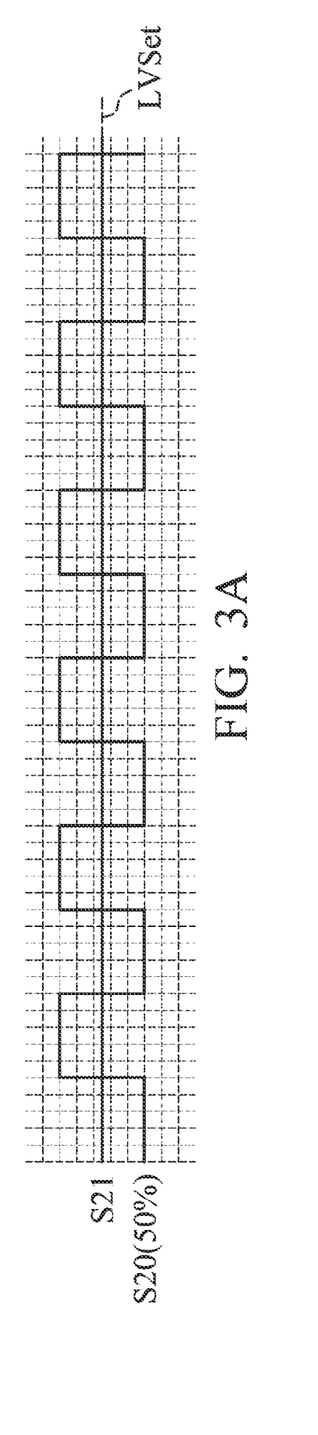
FIGS. 3A-3C shows waveforms of a comparison signal and a duty information signal in current-balance and current-unbalance cases.
Figure 3B:
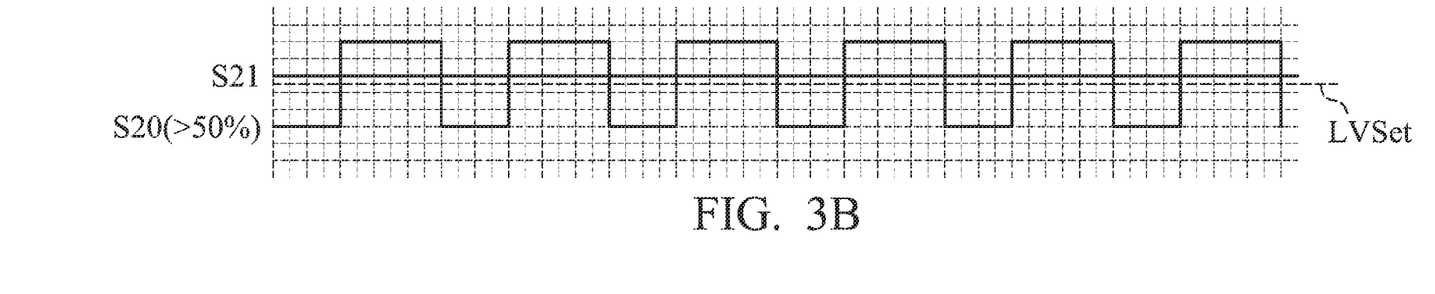
Figure 3C:
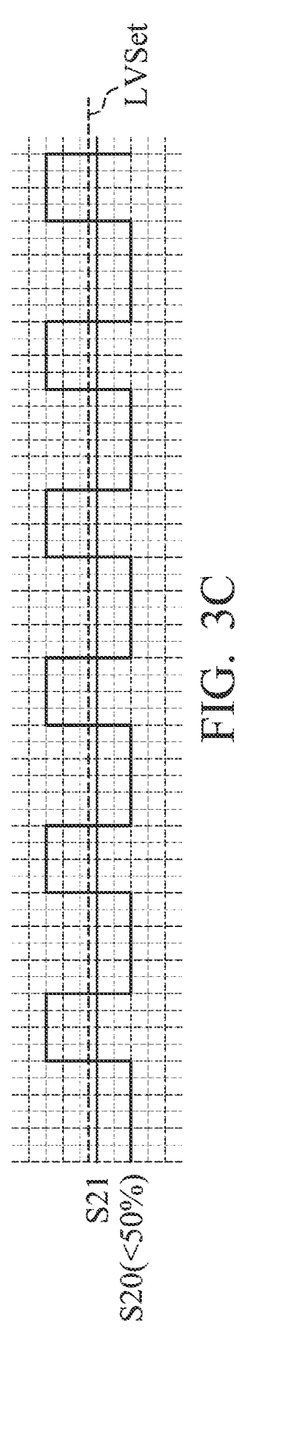

In the embodiment, as shown in FIG. 3A, when the output currents IoutA and IoutB are balanced, the duty cycle of the comparison result signal S20 generated according to the comparison between the feedback voltage signals S11A and S11B is equal to a set duty cycle, for example 50%. At this time, the DC level of the duty information signal S21 is at a set level LVset. When the output currents IoutA and the IoutB are not balanced, the duty cycle of the comparison result signal S20 is larger or less than the set duty cycle 50%, and the DC level of the duty information signal S21 is higher or lower than the set level LVset. As shown in FIG. 3B, when the output currents IoutA and the IoutB are not balanced and the amount of the output current IoutA is larger than the amount of the output current IoutB, the duty cycle of the comparison result signal S20 is larger the set duty cycle 50% (>50%, for example 60%). At this time, the DC level of the duty information signal S21 is higher than the set level LVset. As shown in FIG. 3C, when the output currents IoutA and the IoutB are not balanced and the amount of the output current IoutA is less than the amount of the output current IoutB, the duty cycle of the comparison result signal S20 is less the set duty cycle 50% (<50%, for example 40%). At this time, the DC level of the duty information signal S21 is lower than the set level LVset. Accordingly, whether the output currents IoutA and IoutB are balanced can be known according to the DC level of the duty information signal S21.

In the embodiment, the predefined voltage range of the window comparator 22 is set for current-unbalance tolerance. According to the duty cycle of the comparison result signal S20 and the DC level of the duty information signal S21 in the current-balance case, the upper limit voltage Vref20 defined for the predefined voltage range is set as the DC level of the duty information signal S21 when the duty cycle of the comparison signal S20 is equal to an upper-limit duty cycle larger than the set duty cycle 50%, for example 60%, and the lower limit voltage Vref21 defined for the predefined voltage range is set as the DC level of the duty information signal S21 when the duty cycle of the comparison signal S20 is equal to a lower-limit duty cycle less than the set duty cycle 50%, for example 40%. When the window comparator 22 determines that the DC level of the duty information signal S21 falls into the redefined voltage range, the duty cycles of the control signals S10A and S10B are determined to be not needing adjustments. On the contrary, when the window comparator 22 determines that the DC level of the duty information signal S21 does not fall into the redefined voltage range, the duty cycles of the control signals S10A and S10B are determined to be needing adjustments. According to the above description, the upper limit voltage Vref20 and the lower limit voltage Vref21 of the predefined voltage range define the conditions for the duty-cycle adjustments of the control signals S10A and S10B, thereby determining the balancing accuracy of the output currents IoutA and IoutB.

As the above described, when the output currents IoutA and IoutB are balanced, the duty cycle of the comparison result signal S20 is equal to the set duty cycle 50%, and the DC level of the duty information signal S21 is at the set level LVset falling in the redefined voltage range. The window comparator 22 generates the adjustment signal S22A, for example with a logic value "0", and the adjustment signal S22B, for example with a logic value "0". The duty adjustor 23A receives the adjustment signal S22A with the logic value "0" and the duty adjustor 23B receives the adjustment signal S22B with the logic value "0". As a result, there is no relative adjustment in the duty cycles of the control signals S10A and S10B. Accordingly, the amounts of the output currents IoutA and IoutB which are generated according to the control signals S10A and S10B, respectively, are not relatively changed.

When the output currents IoutA and IoutB are not balanced, the duty cycle of the comparison result signal S20 is not equal to the set duty cycle 50%. In the case where the amount of the output current IoutA is much larger than the amount of the output current IoutB, the DC level of the duty information signal S21 may be higher than the upper limit voltage Vref20 (not falling in the redefined voltage range). The window comparator 22 generates the adjustment signal S22A, for example with a logic value "0", and the adjustment signal S22B, for example with a logic value "1". The duty adjustor 23B receives the adjustment signal S22B with the logic value "1" and relatively increases the duty cycle of the control signal S10B according to the adjustment signal S22B. Moreover, the duty adjustor 23A receives the adjustment signal S22A with the logic value "0" and does not adjust the duty cycle of the control signal S10A according to the adjustment signal S22A. Accordingly, the amount of the output current IoutB which is generated according to the control signal S10B relatively increases.

In the case where the amount of the output current IoutB is much larger than the amount of the output current IoutA, the DC level of the duty information signal S21 may be lower than the lower limit voltage Vref21 (not falling in the redefined voltage range). The window comparator 22 generates the adjustment signal S22A, for example with a logic value "1", and the adjustment signal S22B, for example with a logic value "0". The duty adjustor 23A receives the adjustment signal S22A with the logic value "1" and relatively increases the duty cycle of the control signal S10A according to the adjustment signal S22A. Moreover, the duty adjustor 23B receives the adjustment signal S22B with the logic value "0" and does not adjust the duty cycle of the control signal S10B according to the adjustment signal S22B. Accordingly, the amount of the output current IoutA which is generated according to the control signal S10A relatively increases. Through the duty-cycle determinations and adjustments of the control signals S10A and S10B, the output currents IoutA and IoutB are finally balanced.

In the above embodiment, the duty-cycle adjustments of the control signals S10A and S10B are performed by relatively increasing the duty cycle of the control signal corresponding to the phase with less output current. In another embodiment, the duty-cycle adjustments of the control signals S10A and S10B may be performed by relatively decreasing the duty cycle of the control signal corresponding to the phase with larger output current. In the case where the amount of the output current IoutA is much larger than the amount of the output current IoutB, the DC level of the duty information signal S21 may be higher than the upper limit voltage Vref20. The window comparator 22 generates the adjustment signal S22A, for example with a logic value "1", and the adjustment signal S22B, for example with a logic value "0". The duty adjustor 23A receives the adjustment signal S22A with the logic value "1" and does not adjust the duty cycle of the control signal S10A according to the adjustment signal S22A. Moreover, the duty adjustor 23B receives the adjustment signal S22B with the logic value "0" and increases the duty cycle of the control signal S10B according to the adjustment signal S22B. Accordingly, the amount of the output current IoutB which is generated according to the control signal S10B relatively increases; that is to say, the amount of the output current IoutA which is generated according to the control signal S10A relatively decreases. In the case where the amount of the output current IoutB is much larger than the amount of the output current IoutA, the DC level of the duty information signal S21 may be lower than the lower limit voltage Vref21. The window comparator 22 generates the adjustment signal S22A, for example with a logic value "0", and the adjustment signal S22B, for example with a logic value "1". The duty adjustor 23B receives the adjustment signal S22B with the logic value "1" and does not adjust the duty cycle of the control signal S10B according to the adjustment signal S22B. Moreover, the duty adjustor 23A receives the adjustment signal S22A with the logic value "0" and increases the duty cycle of the control signal S10A according to the adjustment signal S22A. Accordingly, the amount of the output current IoutA which is generated according to the control signal S10A relatively increases; that is to say, the amount of the output current IoutB which is generated according to the control signal S10B relatively decreases. Through the duty-cycle determinations and adjustments of the control signals S10A and S10B, the output currents IoutA and IoutB are finally balanced.

In another embodiment wherein the window comparator 22 is substituted with an ordinary comparator with only one reference voltage, there is no tolerance range and adjustments are always made whenever the output currents IoutA and the IoutB are not balanced, that is, whenever the duty cycle of the comparison result signal S20 is not equal to the set duty cycle (such as 50%).

Figure 4:
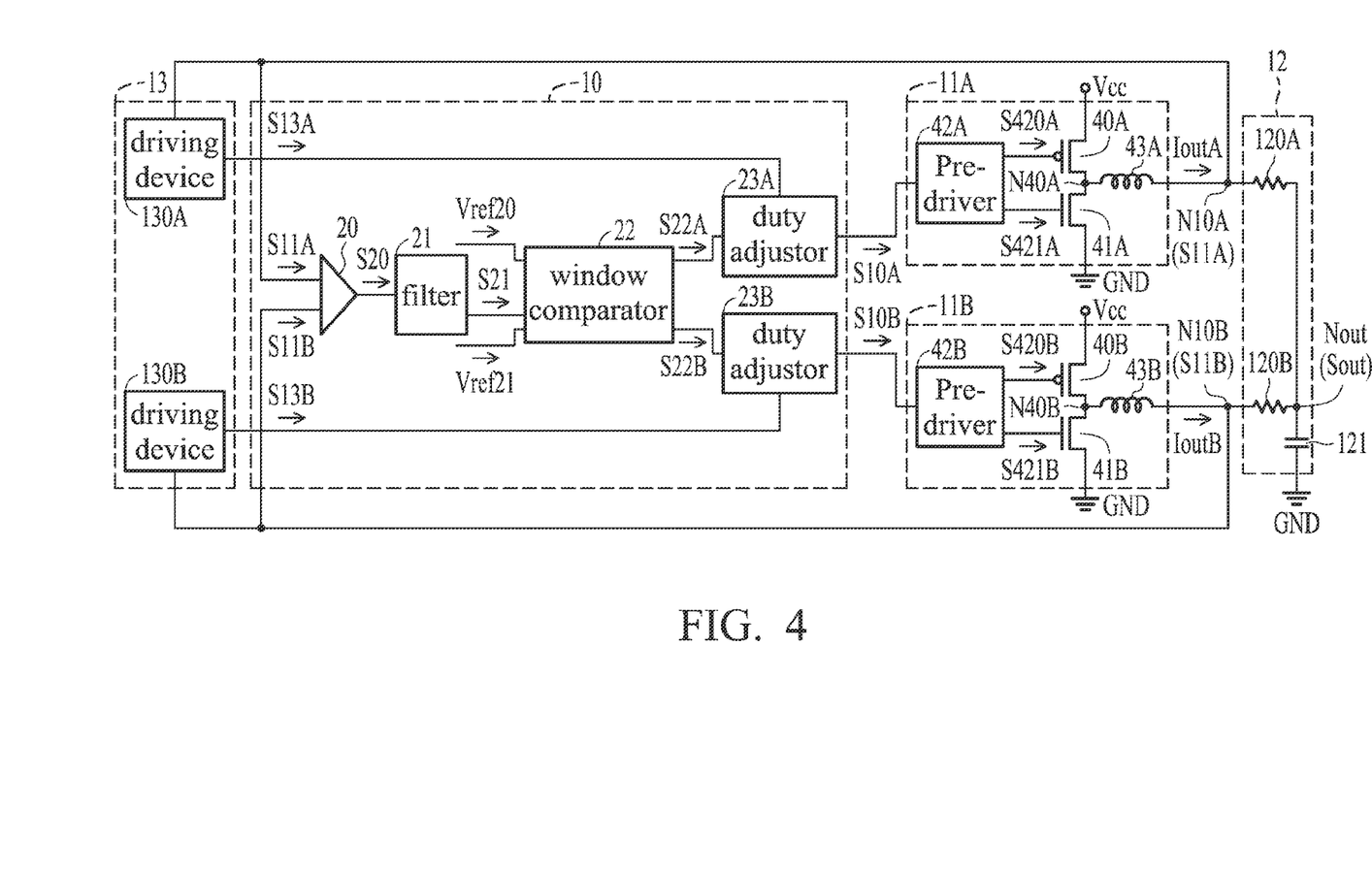
FIG. 4 shows another exemplary embodiment of a signal generation device.

In the embodiment, the output circuits 11A and 11B may be implemented by DC-to-DC voltage converters. As shown in FIG. 4, the output circuit 11A comprises a charging transistor 40A, a discharging transistor 41A, a pre-driver 42A, and an inductor 43A. The pre-driver 42A is coupled to the duty adjustment circuit 10 and receives the control signal S10A. The pre-driver 42A generates driving signals S420A and S421A according to the control signal S10A. The asserted level of the driving signal S420A does not overlap with the asserted level of the driving signal S421A. In the embodiment, the charging transistor 40A is implemented by a P-type transistor, while the discharging transistor 41A is implemented by an N-type transistor. The drain (referred to as a first electrode) of the charging transistor 40A is coupled to a node N40A, the source (referred to as a second electrode) thereof receives a supplying voltage $V_{cc}$, and the gate (referred to as a control electrode) thereof receives the driving signal S420A. The drain of the discharging transistor 41A is coupled to the node N40A, the source thereof is coupled to a reference ground GND, and the gate thereof receives the driving signal S421A. When the driving signal S420A or S421A is at the asserted level, the corresponding transistor 40A or 40B is turned on. Due to the asserted levels of the driving signals S420A and S421A not overlapping, the transistors 40A and 41A are turned on at different times. As shown in FIG. 4, one terminal of the inductor 43A is coupled to the node N40A, and the other terminal thereof is coupled to the node N10A.

Referring to FIG. 4, the output circuit 11B comprises a charging transistor 40B, a discharging transistor 41B, a pre-driver 42B, and an inductor 43B. The pre-driver 42B is coupled to the duty adjustment circuit 10 and receives the control signal S10B. The pre-driver 42B generates driving signals S420B and S421B according to the control signal S10B. The asserted level of the driving signal S420B does not overlap with the asserted level of the driving signal S421B. In the embodiment, the charging transistor 40B is implemented by a P-type transistor, while the discharging transistor 41B is implemented by an N-type transistor. The drain of the charging transistor 40B is coupled to a node N40B, the source thereof receives the supplying voltage $V_{CC}$, and the gate thereof receives the driving signal S420B. The drain of the discharging transistor 41B is coupled to the node N40B, the source thereof is coupled to the reference ground GND, and the gate thereof receives the driving signal S421B. When the driving signal S420B or S421B is at the asserted level, the corresponding transistor 40B or 40B is turned on. Due to the asserted levels of the driving signals S420B and S421B not overlapping, the transistors 40B and 41B are turned on at different times. As shown in FIG. 4, one terminal of the inductor 43B is coupled to the node N40B, and the other terminal thereof is coupled to the node N10B. Although a buck type DC-to-DC voltage converter is used in here as an example, the invention is not limited thereto.

Referring to FIG. 4, the output circuits 11A and 11B form a two-phase voltage converter. As described above, through the operation of the duty adjustment circuit 10, the duty adjustment circuit 10 controls the duty cycles of the control signals S10A and S10B. The output circuits 11A and 11B receive the control signals S10A and S10B and provide the output currents IoutA and IoutB to the nodes N10A and N10B, respectively. By controlling the duty cycles of the control signals S10A and S10B, the amounts of the output currents IoutA and IoutB are also controlled. Accordingly, the output currents IoutA and IoutB of the two-phase voltage converter are balanced.

Figure 5:
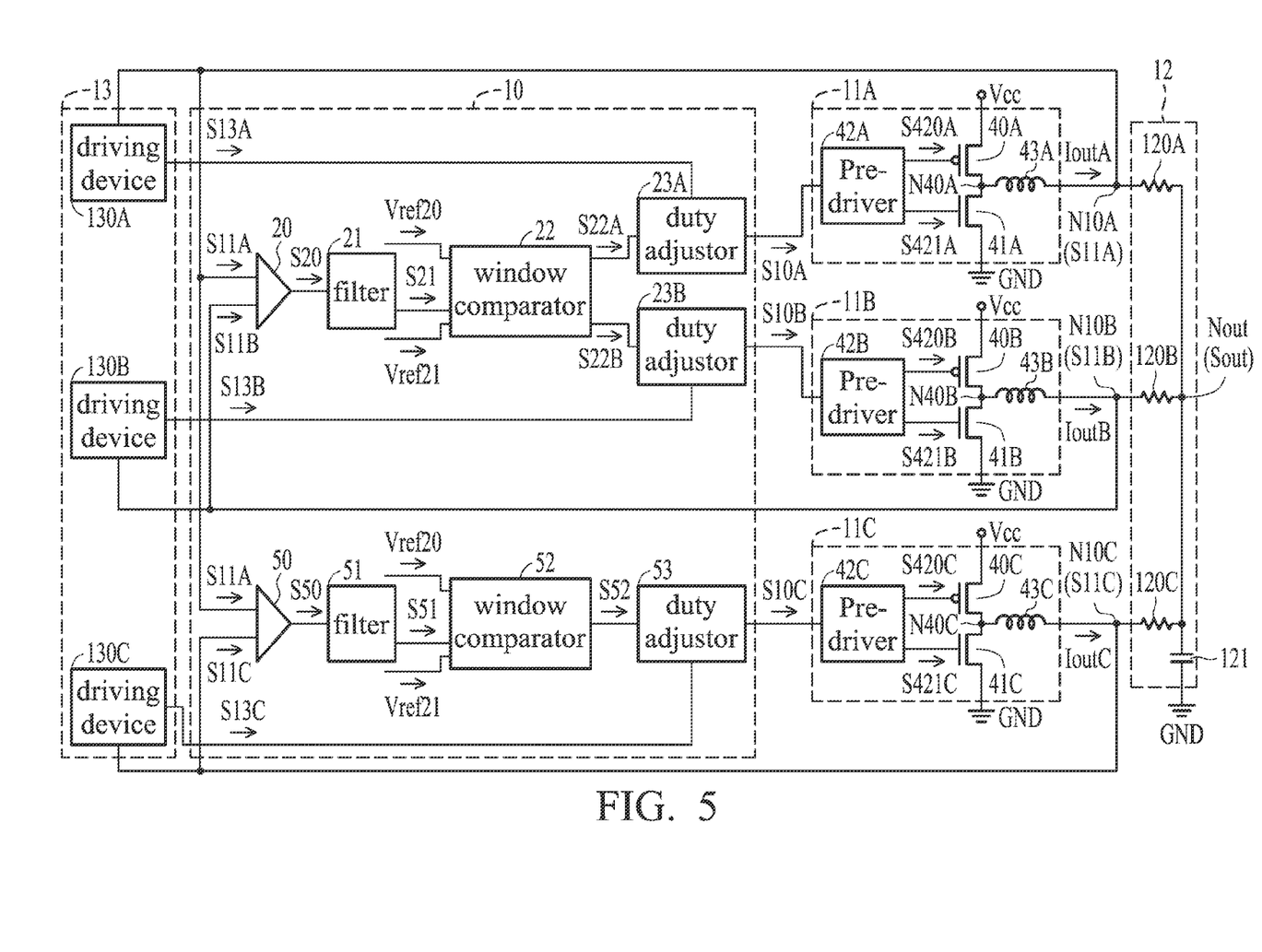
FIG. 5 shows further another exemplary embodiment of a signal generation device.

In the embodiment of FIG. 5, the duty adjustment circuit 10 may be used to balance output currents of a three-phase voltage converter. As shown in FIG. 5, the signal generation device 1 further comprises an output circuit 11C. The driving circuit 13 further comprises a driving device 130C which provides a driving signal S13C. The duty adjustment circuit 10 further generates a control signal S10C according to its third input voltage signal and the driving signal S13C. The output circuit 11C receives the control signal S10C and generates an output current IoutC at a node N10C according to the control signal S10C. The amount of the output current IoutC is determined by the duty cycle of the control signal S10C. The load circuit 12 further comprises a resistor 120C coupled between the node N10C and the output node Nout. In the embodiment of FIG. 5, the load circuit 12 generates the output signal Sout at the output node Nout according to the output currents IoutA, IoutB, and IoutC. Due to the arrangement of the resistor 120C, a feedback voltage signal S11C is generated at the node N10C according to the resistance value of the resistor 120C and the output current IoutC. The duty adjustment circuit 10 receives the feedback voltage signal S11C to serve as its third input voltage signal. In the embodiment, the duty adjustment circuit 10 adjusts the duty cycle of the control signal S10C according to the feedback voltage signal S11C to change the amount of the output current IoutC. Through the duty-cycle determinations and adjustments of the control signals S10A, S10B, and S10C, the output currents IoutA, IoutB, and IoutC may be balanced.

As shown in FIG. 5. the output circuit 11C comprises a charging transistor 40C, a discharging transistor 41C, a pre-driver 42C, and an inductor 43C. The connection structures and operations of the elements in the output circuit 11C are similar to those of the output circuits 11A and 11B, thus, related descriptions are omitted here.

Referring to FIG. 5, the duty adjustment circuit 10 further comprises a comparator 50, a filter 51, a window comparator 52, and a duty adjustor 53. The operations of the comparator 50, the filter 51, the window comparator 52, and the duty adjustor 53 are similar to the operations of the comparator 20, the filter 21, the window comparator 22, and the duty adjustors 23A and 23B, respectively, as described above. In the embodiment, the comparator 50 receives the feedback voltage signals S11A and S11C derived from the output currents IoutA and IoutC, respectively, and generates a comparison result signal S50. The filter 51 receives the comparison result signal S50 and filters the comparison result signal S50 to generate a duty information signal S51 which indicates the duty cycle of the comparison result signal S50. The window comparator 52 receives the reference voltages Vref20 and Vref21 to predefine the same voltage range as the window comparator 22. The window comparator 52 determines whether the DC level of the duty information signal S51 falls into the predefined voltage range to generate one adjustment signal S52. The duty adjustor 53 generates the control signal S10C. The duty adjustor 53 receives the adjustment signal S52 and the driving signal S13C and determines the duty cycle of the control signal S10C according to the adjustment signal S52 and the driving signal S13C. Then, the duty adjustor 53 may adjust the duty-cycle of the control signal S10C or not, depending on whether the DC level of the duty information signal S51 falls into the predefined voltage range. The duty-cycle determination and adjustment operations of the control signal S10C are similar to those of the control signals S10A and S10B described above, thus, related descriptions are omitted here. Accordingly, through the duty-cycle determinations and adjustments of the control signals S10A, S10B, and S10C, the output currents IoutA, IoutB, and IoutA are finally balanced.

In the embodiment of FIG. 5, due to the three-phase voltage converter, the set duty cycle of the comparison result signals S20 and S50 and the set level LVset of the duty information signals S21 and S51 in the current balance case may be different from those in the embodiment of FIG. 2. Moreover, the upper limit voltage Vref20 and the lower limit voltage Vref21 for the definition of the conditions for the duty-cycle adjustments of the control signals S10A, S10B, and S10C and the voltage range for tolerance of current-unbalance may also be different from those in the embodiment of FIG. 2. The concept of the invention may be similarly generalized to balance currents in multi-phase voltage converters with any number of phases.

Figure 6:
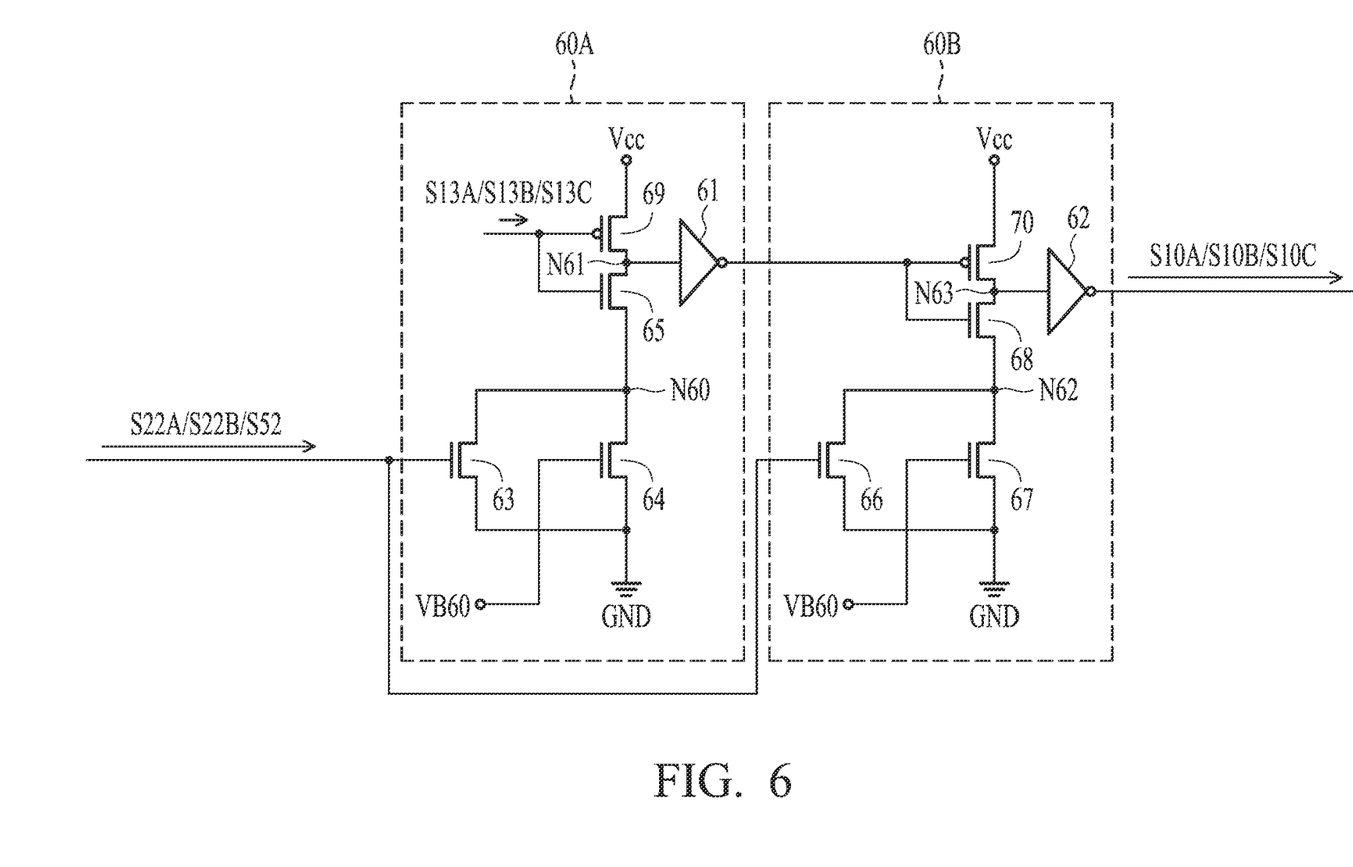
FIG. 6 shows an exemplary embodiment of a duty adjustor in the signal generation device according to the invention.

FIG. 6 shows an exemplary embodiment of the duty adjustors 23A, 23B, and 53 for the embodiment of achieving current balance by relatively increasing the duty cycle of the control signal corresponding to the lower output current phase. The duty adjustor receives the corresponding driving signal S13A, S13B, or S13C and the corresponding adjustment signal S22A, S22B, or S52 and adjusts the duty of the corresponding driving signal S13A, S13B, or S13C by adjusting a transition time of the corresponding driving signal S13A, S13B, or S13C according to the corresponding adjustment signal S22A, S22B, or S52. The corresponding driving signal S13A, S13B, or S13C with the adjusted duty cycle serves as the corresponding control signal S10A, S10B, or S10C for output. In other words, the duty adjustor determines and adjusts the duty cycle of the corresponding control signal S10A, S10B, or S10C according to the corresponding driving signal S13A, S13B, or S13C and the corresponding adjustment signal S22A, S22B, or S52. In one embodiment, each duty adjustor comprises two cascaded stages 60A and 60B providing duty adjustment. As shown in FIG. 6, the first stage 60A comprises a pair of complementary transistors 65 and 69 followed by an inverter 61 and two pull-down transistors 63 and 64. The second stage 60B comprises a pair of complementary transistors 68 and 70 followed by an inverter 62 and two pull-down transistors 66 and 67. In the embodiment, the transistors 6368 are implemented by N-type transistors, while the transistors 69 and 70 are implemented by P-type transistors. The sources of transistors 69 and 70 are coupled to the supplying voltage $V_{CC}$, and the sources of transistors 63, 64, 66, and 67 are coupled to the reference ground GND. The source of transistor 65 is coupled to the drains of the transistors 63 and 64 at a node N60, and the source of transistor 68 is coupled to the drains of the transistors 66 and 67 at a node N62.

The complementary transistors 65 and 69 are driven by the corresponding driving signal S13A, S13B, or S13C, and the output at a node N61 is coupled to the inverter 61. The two pull-down transistors 63 and 64 adjusts the duty cycle of the corresponding driving signal S13A, S13B, or S13C by adjusting the falling time of the output at the node N61. The gate of the pull-down transistor 64 receives a predetermined voltage bias VB60 (providing a predetermined falling time) while the gate of the pull-down transistor 63 receives the corresponding adjustment signal S22A, S22B, or S52. When the gate of the pull-down transistor 63 receives an adjustment signal with the logic value "1," the pull-down transistor 63 is turned on and draws more current through transistor 65, thus increasing the pull-down capability of the pull-down transistor 63. As a result, the output at the node N61 has relatively decreased falling time, comparing with when the logic value is "0." Therefore, the output of the inverter 61 (also the output of the first stage 60A) has relatively decreased rising time, resulting in a relatively increased duty cycle. The second stage 60B works in a similar way, in which the output of the first stage 60A is coupled to drive the pair of complementary transistors 68 and 70. Therefore, the corresponding control signal S10A, S10B, or S10C outputted by the second stage 60B of the duty adjustor has a further relatively increased duty cycle. Although the two stages 60A and 60B are used in here as an example, the number of stages in the duty adjustor may be designed depending on actual situations, and the invention is not limited thereto.

For the embodiment of achieving current balance by relatively decreasing the duty cycle of the control signal corresponding to the higher output current phase, an inverter may be added to be coupled to the gates of the transistors 63 and 66 before they receive the corresponding adjustment signal S22A, S22B, or S52. When the added inverter receives an adjustment signal with the logic value "0," the pull-down transistors 63 and 66 are turned on and the outputs at the nodes N61 and N63 have relatively decreased falling times, comparing with when the logic value is "1." Therefore, the corresponding control signal S10A, S10B, or S10C outputted by the duty adjustor has a relatively increased duty cycle when the corresponding adjustment signal has the logic value "0" comparing with when the logic value is "1;" in other words, the corresponding control signal S10A, S10B, or S10C outputted by the duty adjustor has a relatively decreased duty cycle when the corresponding adjustment signal has the logic value "1" comparing with when the logic value is "0."

In summary, a duty adjustment circuit with a simple structure for balancing output currents in a signal generation device such as a multi-phase voltage converter is developed. The developed duty adjustment circuit does not require complicated designs such as error amplifiers or reference voltages generated by oscillators and adjusted by offset voltages. The design efforts and layout area required in designing multi-phase voltage converters are largely reduced.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A duty adjustment circuit to adjust a duty cycle of a first driving signal, comprising:
    a filter, receiving a comparison result signal and filtering the comparison result signal to generate a duty information signal, wherein the duty information signal indicates a duty cycle of the comparison result signal;
    a first comparator, receiving the duty information signal and determining whether a direct-current (DC) level of the duty information signal falls into a predefined voltage range to generate a first adjustment signal; and
    a first duty adjustor, receiving the first adjustment signal and the first driving signal and adjusting the duty cycle of the first driving signal according to the first adjustment signal.

2. The duty adjustment circuit as claimed in claim 1, further comprising:
    a second comparator, receiving a first feedback voltage signal and a second feedback voltage signal, and comparing the first feedback voltage signal and the second feedback voltage signal to generate the comparison result signal.

3. The duty adjustment circuit as claimed in claim 2, wherein the first driving signal is generated according to a difference between a reference voltage and the first feedback voltage signal.

4. The duty adjustment circuit as claimed in claim 1, wherein when the DC level of the duty information signal is higher than a limit voltage, the first duty adjustor adjusts the duty cycle of the first driving signal by adjusting a transition time of the first driving signal according to the first adjustment signal.

5. The duty adjustment circuit as claimed in claim 1, wherein when the DC level of the duty information signal is lower than a limit voltage, the first duty adjustor adjusts the duty cycle of the first driving signal by adjusting a transition time of the first driving signal according to the first adjustment signal.

6. The duty adjustment circuit as claimed in claim 1, wherein the first duty adjustor comprises:
   a complementary transistor pair, comprising a P-type transistor and a N-type transistor, wherein a gate of the P-type transistor and a gate of the N-type transistor receive the first driving signal, a drain of the P-type transistor is coupled to a drain of the N-type transistor, and a source of the P-type transistor is coupled to a supplying voltage; and
   a pull-down transistor, having a drain coupled to a source of the N-type transistor, a source coupled to a ground voltage, and a gate controlled according to the first adjustment signal.

7. The duty adjustment circuit as claimed in claim 1, further comprising:
   a second duty adjustor, receiving a second adjustment signal and a second driving signal, and adjusting a duty cycle of the second driving signal according to the second adjustment signal,
   wherein the first comparator further generates the second adjustment signal according to whether the DC level of the duty information signal falls into the predefined voltage range.

8. The duty adjustment circuit as claimed in claim 7, wherein when the DC level of the duty information signal is higher than an upper limit voltage, the first duty adjustor adjusts the duty cycle of the first driving signal by adjusting a transition time of the first driving signal according to the first adjustment signal,
   wherein when the DC level of the duty information signal is lower than a lower limit voltage, the second duty adjustor adjusts the duty cycle of the second driving signal by adjusting a transition time of the second driving signal according to the second adjustment signal, and
   wherein the upper limit voltage is higher than the lower limit voltage.

9. The duty adjustment circuit as claimed in claim 8, wherein when the DC level of the duty information signal is lower than the upper limit voltage but higher than the lower limit voltage, the first and second duty adjustors maintain the duty cycles of the first and second driving signals according to the first and second adjustment signals, respectively.

10. The duty adjustment circuit as claimed in claim 7, wherein the first driving signal drives a first voltage converter, and the second driving signal drives a second voltage converter.

11. A signal generation device to generate an output signal, comprising:
   a first output circuit, providing a first output current to a first node according to a first control signal;
   a second output circuit, providing a second output current to a second node according to a second control signal; and
   a duty adjustment circuit, filtering a comparison result signal to generate a duty information signal, generating the first control signal according to a first driving signal and the duty information signal, and generating the second control signal according to a second driving signal and the duty information signal,
   wherein the duty information signal indicates a duty cycle of the comparison result signal,
   wherein the first and second control signals are generated according to whether a DC level of the duty information signal falls into a predefined voltage range, and
   wherein the duty cycles of the first and second control signals are adjusted to balance the first and second output currents.

12. The signal generation device as claimed in claim 11, wherein the duty adjustment circuit comprises:
   a filter, receiving the comparison result signal and filtering the comparison result signal to generate the duty information signal;
   a first comparator, receiving the duty information signal and determining whether the DC level of the duty information signal falls into the predefined voltage range to generate a first adjustment signal and a second adjustment signal;
   a first duty adjustor, receiving the first adjustment signal and the first driving signal and adjusting the duty cycle of the first driving signal according to the first adjustment signal to generate the first control signal; and
   a second duty adjustor, receiving the second adjustment signal and the second driving signal and adjusting the duty cycle of the second driving signal according to the second adjustment signal to generate the second control signal.

13. The signal generation device as claimed in claim 12, wherein the duty adjustment circuit further comprises:
   a second comparator, receiving a first feedback voltage signal and a second feedback voltage signal, and comparing the first feedback voltage signal and the second feedback voltage signal to generate the comparison result signal.

14. The signal generation device as claimed in claim 13, wherein the first driving signal is generated according to a difference between a reference voltage and the first feedback voltage signal, and the second driving signal is generated according to a difference between the reference voltage and the second feedback voltage signal.

15. The signal generation device as claimed in claim 12, wherein each of the first and the second duty adjustor comprises:
   a complementary transistor pair, comprising a P-type transistor and a N-type transistor, wherein a gate of the P-type transistor and a gate of the N-type transistor receive the first driving signal or the second driving signal, a drain of the P-type transistor is coupled to a drain of the N-type transistor, and a source of the P-type transistor is coupled to a supplying voltage; and
   a pull-down transistor, having a drain coupled to a source of the N-type transistor, a source coupled to a ground voltage, and a gate controlled according to the first adjustment signal or the second adjustment signal.

16. The signal generation device as claimed in claim 12, wherein when the DC level of the duty information signal is higher than an upper limit voltage, the first duty adjustor adjusts the duty cycle of the first driving signal by adjusting a transition time of the first driving signal according to the first adjustment signal, wherein when the DC level of the duty information signal is lower than a lower limit voltage, the second duty adjustor adjusts the duty cycle of the second driving signal by adjusting a transition time of the second driving signal according to the second adjustment signal, and wherein the upper limit voltage is higher than the lower limit voltage.

17. The signal generation device as claimed in claim 16, wherein when the DC level of the duty information signal is lower than the upper limit voltage but higher than the lower limit voltage, the first and second duty adjustors maintain the duty cycles of the first and second driving signals according to the first and second adjustment signals, respectively.

18. The signal generation device as claimed in claim 11, further comprising:

a load circuit coupled to the first and second nodes, generating the output signal at an output node according to the first and second output currents, wherein a first feedback voltage signal is generated at the first node according to the first output current, and a second feedback voltage signal is generated at the second node according to the second output current, and wherein the comparison result signal is generated by comparing the first feedback voltage signal and the second feedback voltage signal.

19. The signal generation device as claimed in claim 18, further comprising:

a driving circuit, generating the first driving signal according to a difference between a reference voltage and the first feedback voltage signal, and generating the second driving signal according to a difference between the reference voltage and the second feedback voltage signal.

20. The signal generation device as claimed in claim 11, further comprising:

a plurality of multi-phase output circuits, each providing a multi-phase output current according to a multi-phase control signal; and a plurality of multi-phase duty adjustment circuits, each corresponding to one of the plurality of multi-phase output circuits, each filtering a multi-phase comparison result signal to generate a multi-phase duty information signal, and generating the multi-phase control signal according to a multi-phase driving signal and the multi-phase duty information signal, wherein each of the multi-phase duty information signals indicates a duty cycle of the corresponding multi-phase comparison result signal, wherein each of the multi-phase control signals is generated according to whether a DC level of the corresponding multi-phase duty information signal falls into a predefined voltage range, and wherein the duty cycle of each of the multi-phase control signals is adjusted to balance the first output current and each of the multi-phase output currents.

* * * * *